(12) United States Patent
Enderle et al.

(10) Patent No.: US 7,543,394 B2
(45) Date of Patent: Jun. 9, 2009

(54) EXCHANGING DEVICE

(75) Inventors: Eckhard Enderle, Aalen (DE); Stefan André Binder, Oberkochen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 12/007,172

(22) Filed: Jan. 8, 2008

(65) Prior Publication Data

US 2008/0134486 A1    Jun. 12, 2008

Related U.S. Application Data

(63) Continuation of application No. PCT/EP2006/008657, filed on Sep. 6, 2006.

(30) Foreign Application Priority Data

Sep. 13, 2005  (DE) ........................ 10 2005 043 454

(51) Int. Cl.
*G01B 7/008* (2006.01)
*G01B 5/008* (2006.01)

(52) U.S. Cl. ........................... 33/503; 33/559; 403/328; 403/324; 403/325; 403/DIG. 1; 279/133; 279/137; 279/128; 279/125; 279/157

(58) Field of Classification Search .................. 483/16; 279/133, 137, 128, 125, 157; 33/503, 556, 33/559, 561, 572, 558; 403/109.3, 109.5, 403/109.8, 327, 328, DIG. 1, 321, 322.1, 403/324, 325
See application file for complete search history.

(56) References Cited

U.S. PATENT DOCUMENTS

| | | | |
|---|---|---|---|
| 4,177,568 A | 12/1979 | Werner et al. | |
| 4,254,554 A | 3/1981 | Germano et al. | |
| 4,637,119 A | 1/1987 | Schneider et al. | |
| 4,649,623 A | 3/1987 | Schneider et al. | |
| 4,651,405 A | 3/1987 | McMurtry | |
| 4,688,307 A | 8/1987 | Schneider et al. | |
| 4,738,033 A | 4/1988 | Ferber et al. | |

(Continued)

FOREIGN PATENT DOCUMENTS

DE    38 27 656    8/1989

*Primary Examiner*—Erica E Cadugan
(74) *Attorney, Agent, or Firm*—Walter Ottesen

(57) ABSTRACT

An exchanging device is for exchangeably holding a sensor, probe element or tool on a machine or on a machine part or a rotation-pivot unit on a machine or a machine part, preferably, a coordinate measuring apparatus. The exchanging device includes a take-up holder having a first bearing part and a counter piece (22) having a second bearing part corresponding to the first bearing part. A releasable clamping unit (42), for example, a magnetic clamping unit, is provided with which a clamping force is generated between the first and second bearing parts when the counter piece is accommodated on the take-up holder. A locking device having a first locking element (29) is provided on the take-up holder and a counter piece corresponding to the locking element (29) of the take-up holder is provided on the counter piece (22), for example, in the form of a slider (30). With the locking device, the counter piece can be mechanically coupled to the take-up holder in the state when it is taken up by the take-up holder. The locking element (29) includes a separation interface (31) and a securing element (33) is provided in the form of a line pretensioned by a compression spring (35) via which the separation at the separation interface (31) is limited to a predetermined distance such that, in the case of a collision, no forces which are too great can be applied to the components in that the locking element (29) is lifted out of its seat at the separation interface (31). The securing element ensures that, in the case of a collision, the counter piece (22) remains connected to the take-up holder (21) and a component, which is carried by the counter piece, does not drop off.

22 Claims, 3 Drawing Sheets

U.S. PATENT DOCUMENTS

| | | |
|---|---|---|
| 4,742,621 A | 5/1988 | Mayer et al. |
| 5,041,806 A | 8/1991 | Enderle et al. |
| 5,150,529 A * | 9/1992 | Collingwood ................ 33/503 |
| 5,228,205 A | 7/1993 | Bertz et al. |
| 5,505,005 A | 4/1996 | McMurtry et al. |
| 5,678,967 A * | 10/1997 | Savoie ........................ 279/133 |
| 6,287,059 B1 * | 9/2001 | Hashidate et al. ........... 279/155 |
| 2005/0014620 A1 * | 1/2005 | McMurtry et al. ............ 483/16 |

* cited by examiner

EXCHANGING DEVICE

CROSS REFERENCE TO RELATED APPLICATIONS

This application is a continuation application of international patent application PCT/EP 2006/008657, filed Sep. 6, 2006, and claiming priority from German application 10 2005 043 454.1, filed Sep. 13, 2005, and the entire content of both applications is incorporated herein by reference.

FIELD OF THE INVENTION

The invention relates to an exchanging device for exchanging a sensor, probe element or work tool on a machine or machine part. Exchanging devices of this kind function, for example, to accommodate rotation-pivot units, sensors such as probe heads or probe pin sets on a coordinate measuring apparatus so as to be exchangeable in an automated manner. The exchanging devices can, however, also be utilized in order to take up different work tools on processing machines.

BACKGROUND OF THE INVENTION

Known exchanging devices are so configured that, after each exchange, the taken-up component is reproducibly accommodated on the apparatus so that no new calibration of the taken-up component is needed and the measurement values, which are recorded with different sensors or different probe pins, can be combined with each other without a calibration being switched in therebetween.

Exchanging devices for coordinate measuring apparatus or processing machines are disclosed, for example, in U.S. Pat. Nos. 4,637,119; 4,649,623; 4,688,307; 5,041,806; 4,651,405; 4,738,033; 5,228,205; and, 4,254,554.

Exchanging devices are disclosed in U.S. Pat. Nos. 4,637, 119; 4,649,623; 4,688,307; and, 5,041,806. In these exchanging devices, the clamping of the component to be accommodated on the take-up holder is done with magnetic force. In the arrangement described in U.S. Pat. No. 5,228,205, the clamping of the component to be taken up on the take-up holder is achieved with an underpressure vacuum bell and, in the arrangements of U.S. Pat. Nos. 4,651,405 and 4,738,033, the clamping takes place in each case mechanically. The magnetic clamping of the component to be taken up as set forth in U.S. Pat. Nos. 4,637,119; 4,649,623; 4,688,307; and, 5,041, 806 as well as the take-up by suction of the component to be taken up in accordance with U.S. Pat. No. 5,228,205 are especially suited for automatic exchanging devices wherein the machine computer controls the component, which is to be exchanged, for example, dropping off the sensor to be exchanged in a magazine and taking up a new sensor from the magazine without the operator having to intervene in the exchange operation. If, however, the throwing off of the sensor or of the other taken up component is unintentionally triggered without having moved first to the magazine, then it can easily lead to unintended damage of the sensor when this sensor is dropped off at a higher elevation and falls down. For this reason, it is, for example, known to combine the magnetic clamping with a mechanical latch in rotation-pivot units. For the removal of the taken-up sensor or the taken-up rotation-pivot unit, the latch must be released either manually or is automatically released when dropping the rotation-pivot unit or the sensor in the magazine. The latch unit ensures a rigid coupling between the take-up component and the machine. However, in the case of an unintended collision during a measurement operation, in order to avoid excessive damage by the rigid coupling of the latch unit, the latch is so designed that it automatically unlatches when exceeding a specific force. In the case of a collision, it can happen that the taken-up sensor drops off and is damaged by the subsequent impact.

In the arrangement of U.S. Pat. No. 4,254,554, the component, which is to be taken up, is pulled by a pretensioned steel line against the three point bearing which ensures a reproducible taking up of the component to be taken up. This arrangement affords the advantage that, in the case of a collision, the component, which is to be taken up, can be lifted out of the bearing without the component, which is to be taken up, being entirely separated from the machine thereby. This arrangement is, however, not suitable for a manual or automated exchange.

SUMMARY OF THE INVENTION

It is an object of the invention to provide an exchanging device for the exchangeable accommodation of sensors, probe elements, work tools or rotation-pivot units which, on the one hand, makes possible an automated exchange operation while, on the other hand, in the case of a collision, avoiding a tear off of the accommodated sensor, probe element, work tool or of the rotation-pivot unit.

The exchanging device of the invention is for exchangeably holding one of the elements: a sensor, a probe element and a tool on a machine or a machine part. The exchanging device includes: a take-up holder including a first bearing part; a counter piece releasably mountable on the take-up holder and including a second bearing part corresponding to the first bearing part to permit mounting the counter piece on the take-up holder; a clamping device for generating a releasable clamping force between the first bearing part and the second bearing part when the counter piece is accommodated on the take-up holder; a locking device including a first locking element mounted on the take-up holder and a second locking element mounted on the counter piece; the first locking element and the second locking element being configured to mechanically couple the counter piece to the take-up holder while the counter piece is accommodated on the take-up holder; the first locking element and the take-up holder conjointly defining a separation interface whereat the first locking element can separate from the take-up holder; and, the locking device further including a securing mechanism for limiting a separation of the first locking element from the separation interface to a pregiven distance whereby the counter piece remains connected to the take-up holder should the counter piece tend to separate from the take-up holder notwithstanding the clamping force.

The exchanging device according to the invention has a take-up holder having a first bearing part. The exchanging device also includes a counter piece, which is to be taken up on the take-up holder, and this counter piece has a second bearing part which corresponds to the first bearing part. The bearing part of the take-up holder and the corresponding counter or second bearing part on the counter piece (acting as a counter bearing part) are so configured in a manner known per se that the separation and rejoining of the take-up holder and counter piece takes place reproducibly. A releasable clamping device is provided which generates a clamping force between the first and second bearing parts when the counter piece is taken up on the take-up holder. Furthermore, a locking device is provided which has a first locking element on the take-up holder and a second locking element on the counter piece with the second locking element corresponding to the first locking element. With the locking device, the counter piece can be mechanically coupled to the take-up holder in the state wherein the counter piece is accommodated on the take-up holder. The locking element on the take-up holder is accommodated at a separation interface on the take-up holder and, furthermore, a security mechanism is provided via which a separation at the separation interface is prevented beyond a predetermined distance.

The first and second locking elements should be so designed that no additional clamping force is generated by the locking device between the first bearing part of the take-up holder and the second bearing part of the counter piece.

With the locking device, the exchanging device is protected against an unintended release of the accommodated component. The locking device can be mechanically configured, for example, via a lug which has a slot in which a securing slider engages. However, many other locking devices are possible, for example, a hook which engages in a slot, et cetera. The locking device should, however, be so configured that it automatically latches when the counter piece is taken up and automatically unlatches when an intended drop off of the accommodated component is wanted.

The separation interface for the locking element of the take-up holder is a seat on the take-up holder wherein the locking element of the take-up holder sits during normal operation of the exchanging device. However, if an unintended collision occurs, the locking element is lifted out of the seat on the take-up holder at the separation interface. For this purpose, the separation interface or the seat for the locking element should be arranged in the region of the plane which is defined by the bearing part of the take-up holder. The taken-up component can therefore be lifted out of the bearing. With the securing element, it is ensured for a taken-up component, which is lifted out of the bearing, that this component does not simply drop off but continues to be held notwithstanding the separation until the predetermined distance is reached. The predetermined distance is so designed in dependence upon the machine control that even when the machine is moved with maximum speed in advance of the collision, the machine drives can be stopped within the predetermined distance when a collision situation was registered.

The take-up holder can be arranged on the sensor, probe element, work tool or on a rotation-pivot unit. Alternative to this, the counter piece can be arranged on the sensor, on the probe element, on the work tool or on the rotation-pivot unit.

The securing mechanism can include a line which is connected to the locking element of the take-up holder. Preferably, the line is itself elastic so that it can expand over the predetermined distance. Alternatively, the line can be movably connected to the end lying opposite the separation interface and be pretensioned. The pretensioning can be generated via spring force, pneumatically, hydraulically, magnetically or electrically. The line itself can be, for example, a nylon filament or a stranded steel cable. When the line is elastic or the line take up is displaceable and pretensioned, this affords the advantage that, in the normal case (that is, when no collision case is present), the pretensioning or the elasticity of the line leads to a closing of the separation interface. The locking element of the take-up holder then always sits in a defined state in its seat on the take-up holder which simplifies the exchange operation especially the latching of the locking element on the take-up holder via the corresponding locking element on the counter piece. Basically, it is, however, also possible to use a non-pretensioned and non-elastic line as a securing element when it is ensured via gravity force that, in the normal case when no collision is present, the separation interface is closed.

For a compact configuration, it has been shown to be especially advantageous when a compression spring is provided for the pretensioning of the line.

The separation interface of the security mechanism can be configured to be a conical separation interface or a conically-shaped or spherical separation interface which is positioned near the plane which is defined by the bearing part of the take-up holder. A conical separation interface can be realized in that the locking element of the take-up holder has a cone and the take-up holder has a hollow conically-shaped seat for the cone of the locking element. A spherical separation interface can be achieved in that the locking element has a cutout of a spherical surface and a hollow spherically-shaped seat for the ball surface of the locking element is provided on the take-up holder wherein the locking element engages with the ball surface. A conical or spherical separation interface affords the advantage that, even when lateral shear forces occur, the separation of the locking element at the separation interface takes place easily.

As in the state of the art, the locking element of the counter piece can be a slider which engages in a slot of the locking element. Whenever no forces act from the outside on the slider, the slider is in a locking position because of the pretensioning thereof.

The exchanging device of the invention is preferably used in connection with coordinate measuring apparatus which have a take-up holder movably computer controlled in one or several spatial directions and/or a take-up holder for a sensor which is computer controlled rotatable about one or several spatial directions. Especially advantageous is the use of the present invention in connection with rotation-pivot units in association with corresponding coordinate measuring apparatus. The exchanging device can be provided on the take-up holder for the rotation-pivot unit and/or on the take-up holder for the sensor on the rotation-pivot unit.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
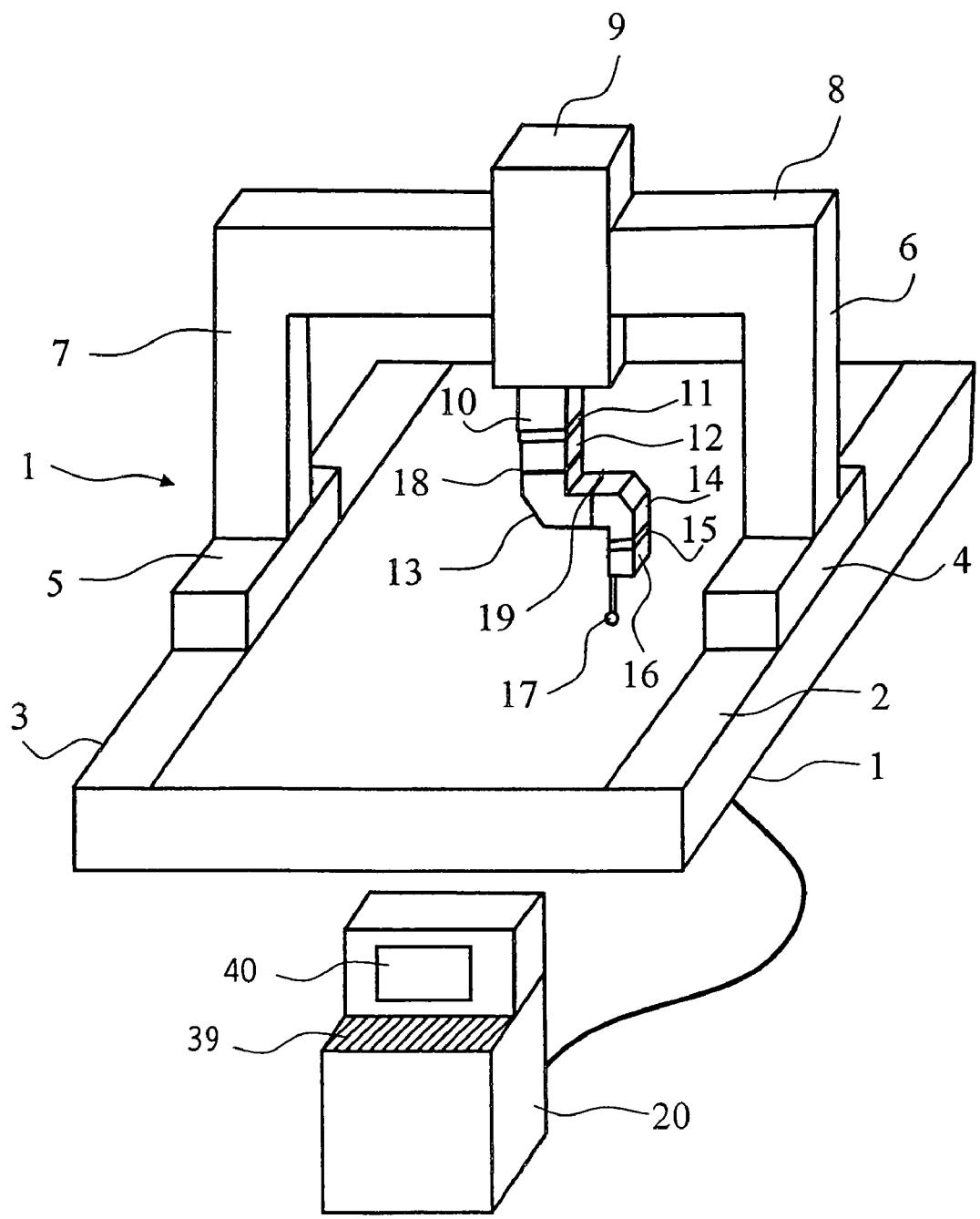
FIG. 1 is a perspective view of a coordinate measuring apparatus having a portal configuration with a rotation-pivot unit accommodated on the spindle of the coordinate measuring apparatus via a first exchanging device and a sensor accommodated on the rotation-pivot unit via a second exchanging device.

In FIG. 1, a coordinate measuring apparatus is identified by reference numeral 1 and has a portal configuration. The coordinate measuring apparatus includes a granite plate on which guide ways (2, 3) are provided. The measuring bridge with its carriages (4, 5) is movable computer-controlled in a direction along the guide ways. Two vertical supports (6, 7) are accommodated on the respective carriages (4, 5) and the traverse member 8 is accommodated on the vertical supports. The transverse carriage 9 is accommodated on the traverse member 8 and is likewise movable computer-controlled along the traverse member and therefore perpendicular to the direction of the guide ways (2, 3). The spindle 10 is accommodated on the transverse carriage 9 and is movable in the vertical direction. The entire apparatus and the movement of the spindle 10 is controlled in the three mutually perpendicular spatial directions via a machine control 20 having a control computer, microprocessors, an operator-controlled panel 39 and a monitor 40.

A rotation-pivot unit (12, 13, 14) is accommodated on the spindle 10 via a first exchanging device 11. On the one hand, the rotation-pivot unit permits computer-controlled rotations in the horizontal plane 18 about an axis, which runs parallel to the axis of the spindle 10 (vertical), and in the vertical rotational plane 19 about an axis which is perpendicular to the axis of the spindle 10. The rotation-pivot unit can be a so-called continuous rotation-pivot unit which permits rotational movements in the two rotational planes (18, 19) through virtually almost any desired rotational angle or as a so-called detented rotation-pivot joint wherein the rotational movement is possible only by fixed pregiven angular increments.

A work element in the form of a sensor 16 with a probe pin 17 accommodated thereon is accommodated on the rotation-pivot unit via a second exchanging device 15. The sensor 16 can be orientated in space as desired via the rotation-pivot unit depending upon what is required by the particular measuring task. The probe pin 17 itself can, in turn, be accommodated on the sensor via a third exchanging device.

Figure 2:
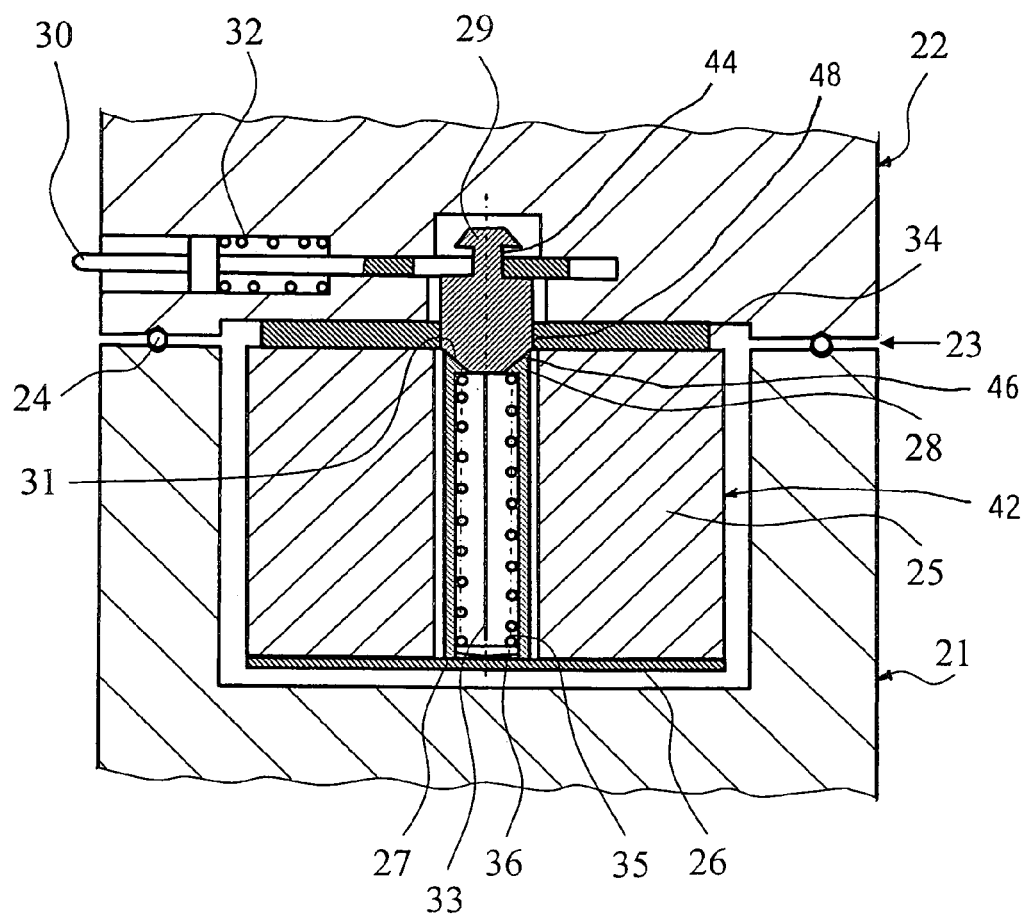
FIG. 2 is a section view taken through an exchanging device according to the invention; and, FIG. 3 is a schematic view of a separation interface that includes a convex-shaped spherical surface and a concave-shaped spherical surface.

The configuration of the exchanging devices (11, 15) is shown in section in FIG. 2. The exchanging device has a take-up holder 21 which carries a first bearing part 23. The counter piece 22 is accommodated on the take-up holder 21 and has a second bearing part (acting as a counter bearing part) which corresponds to the bearing part of the take-up holder. The bearing part of the take-up holder 21 and the bearing part of the counter piece 22 are so configured that they conjointly define a three point bearing. For example, the bearing part 23 of the take-up holder 21 can have three balls with each two balls being separated by 120° and the counter bearing part of the counter piece 22 can have corresponding recesses which are so matched to the balls of the first bearing part 23 that the counter piece 22 is always accommodated reproducibly on the take-up holder 21. In order to avoid a possible ambiguity relative to a rotation by 120° in the plane defined by the bearing, one position can be designated by an additional element 24, for example, a ball having a recess assigned thereto in the counter piece 22.

A combination of an electromagnet and a permanent magnet is contained in a recess of the take-up holder 21 as a releasable clamping device 42. An armature plate 34 is attached to the counter piece 22 and is pulled by the magnet 25. When the counter piece 22 is taken up by the take-up holder 21, the counter piece is correspondingly held via magnetic force. The combination of the permanent magnet and the electromagnet affords the advantage that the electromagnet is activated only during an exchange operation and, in normal measuring operation, the clamping action takes place exclusively via the permanent magnet so that the energy dissipation and therefore the warming by the electromagnet is minimal. The detailed configuration of such a magnetic exchanging device is, for example, disclosed in U.S. Pat. Nos. 4,637,119; 4,649,623; 4,688,307; and, 5,041,806 all incorporated herein by reference.

Alternative to magnetic clamping, clamping can also be realized by underpressure as described in U.S. Pat. No. 5,228,205. In this case, the configuration of the clamping unit and therefore also the configuration of the take-up holder and of the counter piece 22 must be correspondingly modified.

For latching the exchanging device, a locking element 29, which is configured as a lug, is provided on the take-up holder 21. The locking element 29 engages through a bore 48 of the armature plate 34. The locking element 29 is tapered and has a slot 44. The counter piece 22 has a slider 30 in a recess and this slider is pretensioned by a spring 32. The slider 30 engages in the slot 44 of the locking element 29. The locking element 29 of the take-up holder has a conical separation interface 31 approximately at the elevation of the bearing plane defined by the bearing 23. The conical separation interface 31 is conjointly defined by the locking element 29 and a seat 46 formed on a small tube 27 and is accommodated so as to be separable at the seat 46 configured as a conical recess. The tube 27 has an end directed toward the component to be accommodated and this end has a conical inner surface corresponding to the conical outer surface of the locking element 29 passing through the armature plate 34.

Figure 3:
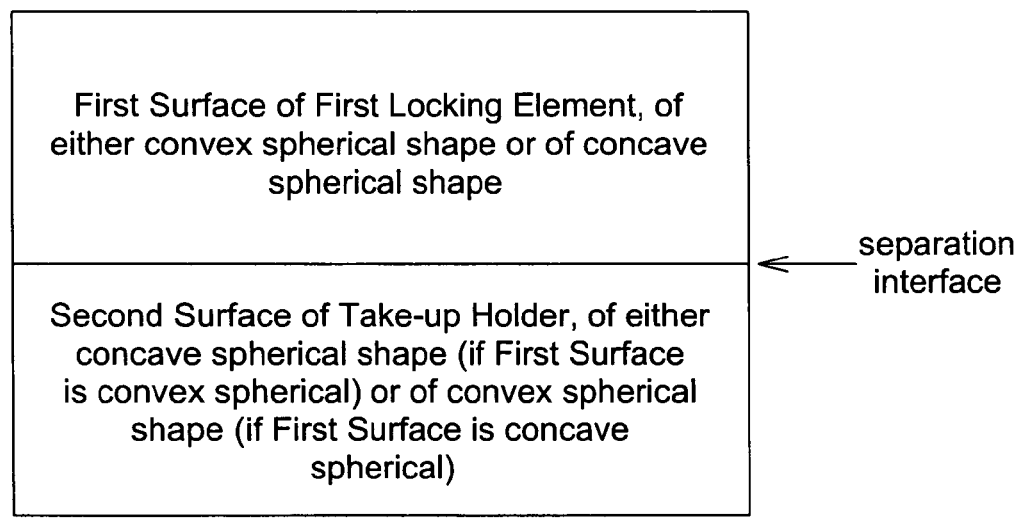

As an alternate embodiment and referring to FIG. 3, the separation interface can be configured to be spherical. Here, the first surface of the first locking element has a convex-shaped or concave-shaped spherical surface and the take-up holder has the other of a concave-shaped spherical surface or a convex-shaped spherical surface.

As viewed in FIG. 2, a compression spring 35 is disposed in the interior of the tube 27 and a line 33 is guided within the compression spring. The line 33 is connected to the locking element 29 which passes through the opening of the armature plate 34 and is connected at the opposite-lying end to a clamp element 36. The clamp element 36 is slidably guided in the tube 27.

In taking up the counter piece 22, the take-up holder 21 is first so positioned relative to the counter piece 22 that the locking element 29 of the take-up holder 21 passes through the hole in the armature plate 34 and, with a further movement toward each other, the locking element 29 presses the slider 30 to the side via the tip of the locking element and thereby opens the locking device. The slider 30 latches, because of its pretensioning, into the slot 44 in the locking element 29 when the locking element is introduced so far that the slot reaches the elevation of the slider 30. The dimensions of the slot in the locking element 29 are so selected relative to the slider 30 that the locking device generates no clamping force on the bearing 23 between the take-up holder 21 and the counter piece 22. The slider 30 and the slot 44 in the locking element 29 have an adequately large play for this purpose because the clamping between the take-up holder 21 and the counter piece 22 is intended to take place exclusively with the aid of the magnet 25 so that the reproducibility of the take up is ensured.

An unintended throw off of the taken-up component is prevented by the locking device. Even when the magnet 25 is switched to a state for throwing off the taken-up component 22, the locking device remains engaged with the locking element 29 as long as the slider 30 is not pressed against the force of the spring 32.

If, in contrast, an exchange is wanted and there is a movement to the appropriate magazine position, the wall or another component of the magazine provided therefor presses against the slider 30 and unlatches the locking device. With a subsequent reduction of the magnetic force in that the electromagnet is so controlled that it compensates or overcompensates for the magnetic force of the permanent magnet, the take-up holder 21 and the counter piece 22 can be separated from each other.

In the case of an unintended collision, that is, when, for example, forces act against the counter piece 22 from the side which are greater than the magnetic holding force (greater than the holding force of the clamping unit), then the counter piece 22 is lifted out of the bearing 23. At the same time, the locking element 29 is separated from the tube 27 at the separation interface 31. With increasing forces, the line 33, which is attached to the locking element 29, is pulled upwardly against the force of the compression spring 35. The clamp element 36 slides in the tube 27 in the upward direction toward the bearing plane. The locking element 29 remains continuously connected to the take-up holder 21 by the line 33. An overstressing of the spring 35 is precluded by configuring the securing element as the line 33 which is pretensioned by the compression spring 35.

The clamping force generated by the securing element on the locking element 29 is preferably less than the clamping force with which the counter piece 22 is held on the take-up holder by the clamping unit 42.

The take-up holder and the counter piece further include contact pins (not shown) which correspond to each other and by means of which a separation between the take-up holder 21 and the counter piece 22 is detected. In the case of a collision (that is, when the counter piece 22 is lifted out of the bearing 23), this occurrence is registered by the interruption of the contacts. The apparatus control then abruptly switches the drives off and the spindle still has a certain afterrun until it comes to standstill. The movement path, which the securing element permits for a separation of the locking element 29 at the separation interface 31, is so dimensioned that, for a maximum forward movement of the apparatus drives after the detection of the collision, the standstill position of the apparatus drives is reached before the maximum separation of the locking element at the separation interface 31 is reached. This maximum separation is made possible by the securing element. The pretensioning of the securing element, which is generated by the spring, is so designed that even with a maximum compression of the compression spring, the occurring forces are so slight that no damage occurs. In this way, even in the case of a collision, damage to the machine or to the counter piece accommodated thereon is avoided.

The take-up holder 21 can be mounted on the spindle of the coordinate measuring apparatus. In this case, the counter piece 22 would either be mounted on a rotation-pivot unit or on a sensor to be taken up on the spindle. Alternatively, the take-up holder 21 can also be mounted on a rotation-pivot unit. In this case, the counter piece 22, which is to be accommodated, is mounted on the sensor which is to be taken up on the rotation-pivot unit.

As shown in FIG. 2, the clamping unit 42 can be mounted in a recess of the take-up holder 21. It is, however, also possible to arrange the clamping unit 42 in a recess of the counter piece 22.

The spring 35 for pretensioning the line 33, which forms the securing element, is not necessary when it is ensured that the separation interface 31 is closed during the exchange operation without pretensioning the line 33. For example, this can be achieved when the take-up holder 21, during an exchange operation, is always in the vertically upward direction.

By pretensioning the securing element 33, it is, however, ensured that the separation interface in the normal case (that is, when no collision has occurred) is closed for any desired orientation of the exchanging device.

A tension spring can be used in lieu of the compression spring for the pretensioning of the securing element 33. Alternatively, it is also conceivable to generate the pretensioning force pneumatically, hydraulically or by magnetic force. Alternatively, it is also possible to configure the securing element 33 as an elastic line, for example, as a strong rubber line and to attach this line tightly to the take-up holder 21 at the end facing away from the securing element 33.

The invention is explained in the context of a coordinate measuring apparatus having a bridge or portal configuration. The exchanging device of the invention can, however, likewise be used in coordinate measuring apparatus of the so-called stand configuration or even in processing machines.

It is understood that the foregoing description is that of the preferred embodiments of the invention and that various changes and modifications may be made thereto without departing from the spirit and scope of the invention as defined in the appended claims.

What is claimed is:

1. A holding device for exchangeably holding a work element on a machine or a machine part, the holding device comprising:

a take-up holder including a first bearing part;

a counter piece releasably mountable on said take-up holder and including a second bearing part corresponding to said first bearing part to permit mounting said counter piece on said take-up holder;

a clamping device for generating a releasable clamping force between said first bearing part and said second bearing part when said counter piece is accommodated on said take-up holder;

a locking device including a first locking element mounted on said take-up holder and a second locking element mounted on said counter piece;

said first locking element and said second locking element being configured to mechanically couple said counter piece to said take-up holder while said counter piece is accommodated on said take-up holder;

said first locking element and said take-up holder conjointly defining a separation interface whereat said first locking element can separate from said take-up holder; and, said locking device further including a securing mechanism for limiting a separation of said first locking element from said take-up holder at said separation interface to a pregiven distance whereby said counter piece remains connected to said take-up holder should said counter piece tend to separate from said take-up holder notwithstanding said clamping force.

2. The holding device of claim 1, wherein said take-up holder is mounted on said work element.

3. The holding device of claim 1, wherein said counter piece is mounted on said work element.

4. The holding device of claim 1, wherein said securing mechanism includes a line.

5. The holding device of claim 4, wherein said line is elastic.

6. The holding device of claim 4, wherein said securing mechanism further includes means for pretensioning said line.

7. The holding device of claim 6, said pretensioning means being a compression spring for pretensioning said line.

8. The holding device of claim 1, wherein said first locking element has a first surface; said take-up holder has a second surface; said first and second surfaces conjointly define said separation interface whereat said take-up holder and said first locking element bear on each other; and, one of said surfaces is a convex-shaped spherical surface and the other one of said surfaces is a concave-shaped spherical surface.

9. The holding device of claim 1, wherein said first locking element has a first surface; said take-up holder has a second surface; said first and second surfaces conjointly define said separation interface whereat said take-up holder and said first locking element bear on each other; and, one of said surfaces is a conical surface and the other one of said surfaces is also a conical surface.

10. The holding device of claim 1, wherein said second locking element is a pretensioned slider releasably engaging said first locking element.

11. A coordinate measuring apparatus for measuring workpieces comprising:

a holding device for exchangeably holding a work element;

a mechanic for moving said holding device in at least one of the following ways: by displacing said holding device in a selected spatial direction and by rotating said holding device about a selected rotational axis;

a computer control for controlling said mechanic to carry out the movement of said holding device; and, said holding device including:

a take-up holder including a first bearing part;

a counter piece releasably mountable on said take-up holder and including a second bearing part corresponding to said first bearing part to permit mounting said counter piece on said take-up holder;

a clamping device for generating a releasable clamping force between said first bearing part and said second bearing part when said counter piece is accommodated on said take-up holder;

a locking device including a first locking element mounted on said take-up holder and a second locking element mounted on said counter piece;

said first locking element and said second locking element being configured to mechanically couple said counter piece to said take-up holder while said counter piece is accommodated on said take-up holder;

said first locking element and said take-up holder conjointly defining a separation interface whereat said first locking element can separate from said take-up holder; and, said locking device further including a securing mechanism for limiting a separation of said first locking element from said take-up holder at said separation interface to a pregiven distance whereby said counter piece remains connected to said take-up holder should said counter piece tend to separate from said take-up holder notwithstanding said clamping force.

12. The coordinate measuring apparatus of claim 11, wherein said take-up holder is mounted on said work element.

13. The coordinate measuring apparatus of claim 12, wherein said work element is a rotation-pivot unit having two rotational axes perpendicular to each other for rotating a sensor mounted on said rotation-pivot unit about said two rotational axes.

14. The coordinate measuring apparatus of claim 11, wherein said counter piece is mounted on said work element.

15. The coordinate measuring apparatus of claim 14, wherein said work element is a rotation-pivot unit having two rotational axes perpendicular to each other for rotating a sensor mounted on said rotation-pivot unit about said two rotational axes.

16. The coordinate measuring apparatus of claim 11, wherein said securing mechanism includes a line.

17. The coordinate measuring apparatus of claim 16, wherein said line is elastic.

18. The coordinate measuring-apparatus of claim 16, wherein said securing mechanism further includes means for pretensioning said line.

19. The coordinate measuring apparatus of claim 18, said pretensioning means being a compression spring for pretensioning said line.

20. The coordinate measuring apparatus of claim 11, wherein said first locking element has a first surface; said take-up holder has a second surface; said first and second surfaces conjointly define said separation interface whereat said take-up holder and said first locking element bear on each other; and, one of said surfaces is a convex-shaped spherical surface and the other one of said surfaces is a concave-shaped spherical surface.

21. The coordinate measuring apparatus of claim 11, wherein said first locking element has a first surface; said take-up holder has a second surface; said first and second surfaces conjointly define said separation interface whereat said take-up holder and said first locking element bear on each other; and, one of said surfaces is a conical surface and the other one of said surfaces is also a conical surface.

22. The coordinate measuring apparatus of claim 11, wherein said second locking element is a pretensioned slider releasably engaging said first locking element.

* * * * *